(12) United States Patent
Verwys et al.

(10) Patent No.: US 11,066,008 B2
(45) Date of Patent: Jul. 20, 2021

(54) LIGHTING THROUGH CHROME PLATING OR CHROME-LIKE SURFACE TREATMENTS

(71) Applicant: Honda Motor Co., Ltd., Tokyo (JP)

(72) Inventors: Nichole A. Verwys, Marysville, OH (US); Zachary Segraves, Redwood City, CA (US)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 16/173,193

(22) Filed: Oct. 29, 2018

(65) Prior Publication Data

US 2019/0366912 A1 Dec. 5, 2019

Related U.S. Application Data

(60) Provisional application No. 62/677,305, filed on May 29, 2018.

(51) Int. Cl.
| | |
|---|---|
| *B60Q 1/26* | (2006.01) |
| *B60Q 1/00* | (2006.01) |
| *B60Q 3/54* | (2017.01) |
| *B60Q 3/20* | (2017.01) |

(52) U.S. Cl.
CPC ......... *B60Q 1/2661* (2013.01); *B60Q 1/0058* (2013.01); *B60Q 1/2653* (2013.01); *B60Q 1/2669* (2013.01); *B60Q 3/20* (2017.02); *B60Q 3/54* (2017.02); *B60Q 2400/10* (2013.01)

(58) Field of Classification Search
CPC ................................................... B32B 15/00
See application file for complete search history.

(56) References Cited

U.S. PATENT DOCUMENTS

| | | |
|---|---|---|
| 4,645,970 A | 2/1987 | Murphy |
| 6,123,871 A | 9/2000 | Carroll |
| 6,561,667 B2 | 5/2003 | Stapf |
| 6,673,437 B2 | 1/2004 | Kohla et al. |
| 7,364,315 B2 | 4/2008 | Chien |
| 7,731,375 B2 | 6/2010 | Palmer et al. |
| 8,016,465 B2 | 9/2011 | Egerer et al. |
| 8,113,695 B2 | 2/2012 | Meinke et al. |
| 8,333,492 B2 | 12/2012 | Dingman et al. |
| 8,344,369 B2 | 1/2013 | Yamazaki et al. |
| 8,469,562 B2 | 6/2013 | Marzorati et al. |
| 2009/0072556 A1 | 3/2009 | Kudelko et al. |

(Continued)

*Primary Examiner* — Joseph L Williams
(74) *Attorney, Agent, or Firm* — Rankin, Hill & Clark LLP

(57) ABSTRACT

An illuminable vehicle component and a method for illuminating a vehicle component includes a vehicle component including an A-surface, a photoluminescent or electroluminescent light source covering the A-surface, a pigmented layer coving the photoluminescent or electroluminescent light source, and an optional optically clear top coat covering the pigmented layer. When the photoluminescent or electroluminescent light source is not activated and is not emitting light, the pigmented layer has an opaque appearance. When the photoluminescent or electroluminescent light source is activated to emit light, light emitted from the photoluminescent or electroluminescent light source is transmitted through the pigmented layer and the optional optically clear top coat such that the illuminable vehicle component has an illuminated appearance and the component is illuminated.

16 Claims, 3 Drawing Sheets

(56) References Cited

U.S. PATENT DOCUMENTS

2009/0129107 A1   5/2009  Egerer et al.
2010/0321946 A1  12/2010  Dingman et al.
2016/0043662 A1*  2/2016  Luchinskiy ............ A42B 1/008
                                                      362/103
2017/0334342 A1* 11/2017  Dellock .................... F21V 9/38

* cited by examiner

LIGHTING THROUGH CHROME PLATING OR CHROME-LIKE SURFACE TREATMENTS

CROSS-REFERENCE TO RELATED APPLICATION

The present application claims priority to U.S. Provisional Patent Application Ser. No. 62/677,305 filed May 29, 2018, which is incorporated herein by reference.

BACKGROUND

Attempts have been made to provide distinctive functional and aesthetic components for vehicles that are easily recognizable and identifiable. For this purpose, vehicle components often include elaborate forms and arrangements of parts so that they can be quickly and easily visually perceived. However, in dim lighting conditions, vehicle components may not be readily visible due to lack of adequate lighting of the component or glare from surrounding lights. Such components often cannot be seen unless illuminated by lighting that is extrinsic to the vehicle or by vehicle lighting that is dedicated to illuminating the component.

Lack of visibility of functional components, such as door handles, makes it challenging to locate the components to exploit their functionality in the dim conditions. Lack of visibility of aesthetic components, such as insignias, inhibits the components from contributing to the aesthetic appeal of a vehicle. To address these difficulties, vehicle components often include dedicated lighting fixtures for illumination. However, these lighting fixtures are typically bulky and therefore require a recess or other structure formed in the component for housing the lighting fixture and associated electrical connections. Such housing structures in the component necessarily increases the size and complexity of the component.

Conventional methods for providing illumination of interior and exterior vehicle components is achieved with light emitting diodes (LEDs) that require bulky wiring harnesses and are arranged in large housings within the vehicle component to conceal the LEDs. In other cases such as conventional interior door handles for example, the component is illuminated solely by indirect cabin light sources such as side lighting or LED lighting. Even current LED back lighting of interior or exterior components requires bulky electrical housing and only provides pinpoints illumination only to one specific area. Additionally, conventional vehicle lighting features are rigid, and therefore are limited in terms of three dimensional design curvature and do not conform to the contours of the vehicle component to which they are applied, increasing the necessity of such lighting features to be placed in a housing within the component.

SUMMARY

According to one aspect, a vehicle component includes an electroluminescent or photoluminescent light source arranged on an A-surface of the vehicle component, a pigmented layer covering the light source, and a clear top coat layer covering the pigmented layer. When the light source is not activated, the pigmented layer has an opaque appearance, and when the light source is activated, the light source emits light that is visible through the pigmented layer and the clear top coat layer to thereby illuminate the vehicle component. The light source has a shape that is conformed to contours of the A-surface.

According to another aspect, a vehicle includes a component having an A-surface, an electroluminescent or photoluminescent light source arranged on the A-surface and having a shape that is conformed to contours of the A-surface, and a pigmented layer covering the light source. When the light source is not activated, the pigmented layer provides an opaque appearance to the component. When the light source is activated, the light source emits light that is visible through the pigmented layer to thereby provide an illuminated appearance to the component.

According to a further aspect, a method of illuminating a vehicle component includes providing a vehicle component including an A-surface. An electroluminescent or photoluminescent light source is disposed over the A-surface of the vehicle component. The light source emits light when activated and is conformed to the contours of the A-surface. A pigmented layer is arranged to cover the light source. The light source is activated to emit light, thereby changing an appearance of the pigmented layer from an opaque chrome appearance to an illuminated appearance. The light source is not located in a housing.

DETAILED DESCRIPTION

Figure 1:
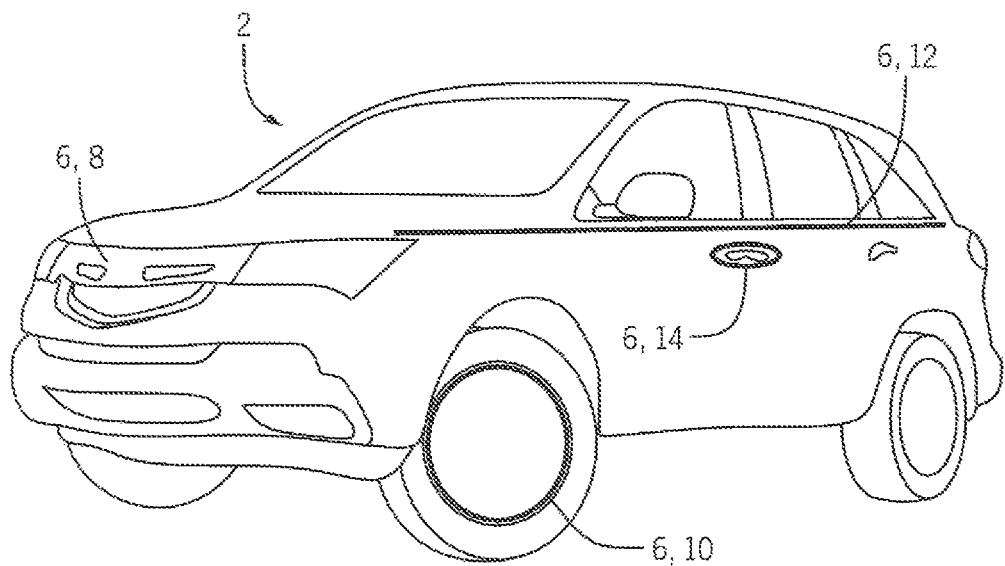
FIG. 1 is a front left view of a vehicle with illuminable vehicle components according to an exemplary embodiment.
Figure 2:
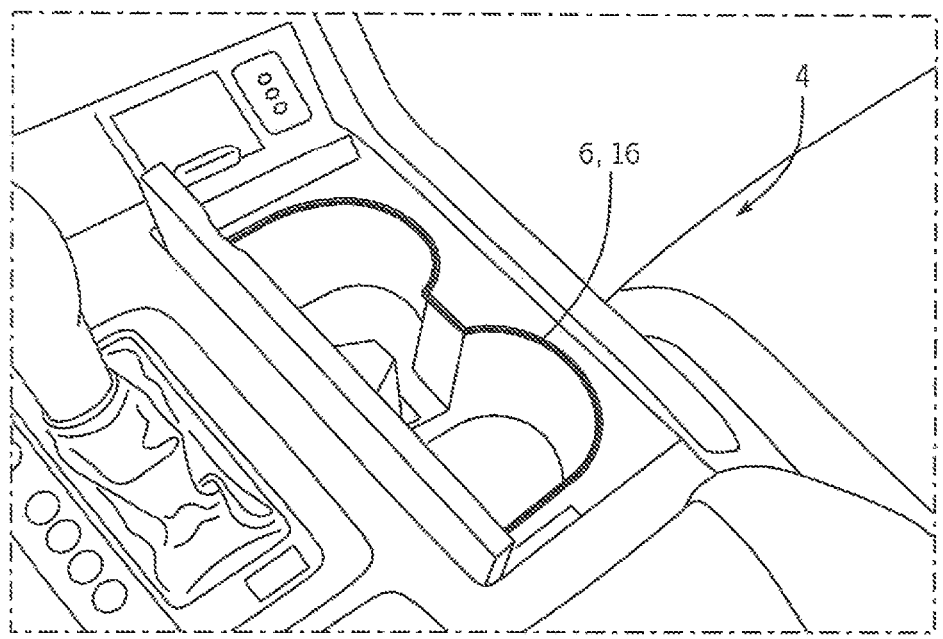
FIG. 2 is a perspective view of interior of a vehicle with an illuminable vehicle component according to an exemplary embodiment.

Referring now to the figures wherein the showings are for purposes of illustrating one or more embodiments only and not for purposes of limiting the same, FIG. 1 depicts a vehicle 2 and FIG. 2 depicts a vehicle interior 4, each including one or more exemplary illuminable vehicle components 6. The vehicle 2 in FIG. 1 is depicted to include several illuminable vehicle components 6 including an illuminable grill 8, an illuminable wheel rim 10, an illuminable side streamer 12, and an illuminable exterior door handle 14. The vehicle interior 4 in FIG. 2 is depicted to include only one illuminable vehicle component 6 being an illuminable cup holder 16. As will be appreciated, more or fewer illuminable vehicle components 6 than depicted in FIGS. 1 and 2 can be included on the vehicle 2 in accordance with the present subject matter. Moreover, illuminable vehicle components 6 may be provided anywhere on the vehicle 2 as desired, including for example, anywhere at the exterior or in the interior 4 of the vehicle 2, such as in the passenger's compartment. Illumination of the various vehicle components allows for easier visual recognition of the vehicle components in dark or dim conditions, or even in well-lit conditions.

Figure 3:
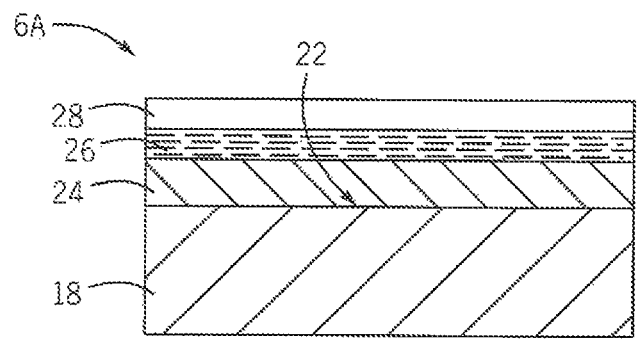
FIGS. 3-5 are cross-sectional views of illuminable vehicle components according to exemplary embodiments.
Figure 4:
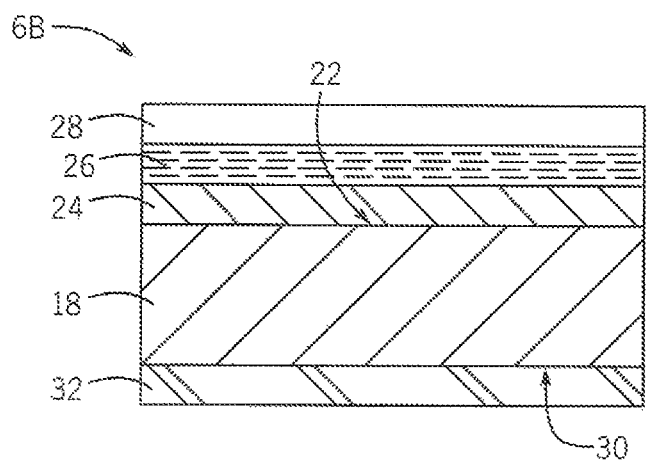
Figure 5:
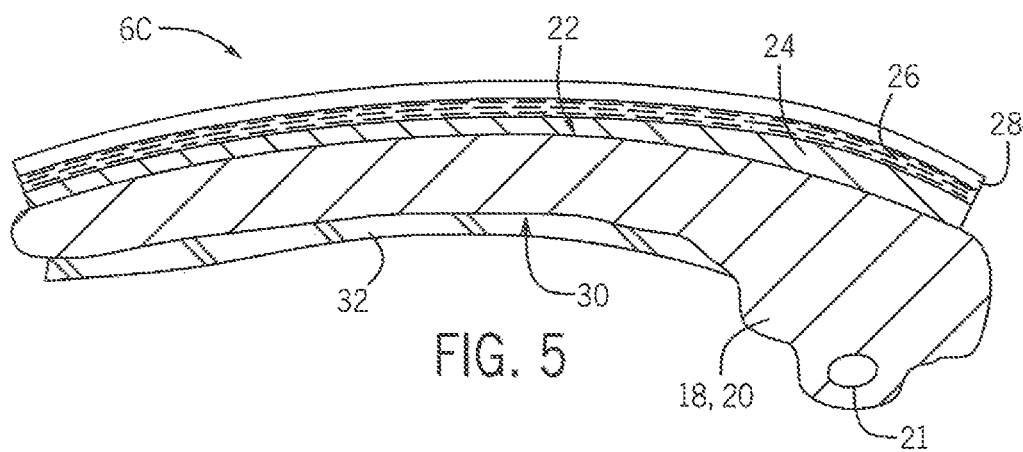

In a non-limiting example and with additional reference to FIGS. 3-5, an illuminable vehicle component (6A, 6B, and 6C respectively) includes a vehicle component 18 as a base upon which other layers of the illuminable vehicle component 6 are arranged. The vehicle component 18 is not particularly limited, and the present illumination configurations and methods provide lighting to various interior and exterior vehicle components including for example, passenger compartment components, wheel and suspension components, body components, powertrain components, and exhaust components. In a non-limiting example, illuminable interior vehicle components include moldings, trims, insignias, and accent pieces, and functional components such as handles or other vehicle controls (e.g. steering wheel). In a non-limiting example, illuminable exterior vehicle components include door handles, wheels, the grill, side mirrors, running boards, exhaust covers, and side streamers. The vehicle component 18 may include for example, a handle 20 including a pivot 21 as depicted in FIG. 5, and may be made from any material. As depicted in FIG. 5, the handle 20 is the base upon which other layers of the illuminable vehicle component 6C are arranged. The illuminable vehicle component 6C depicted in FIG. 5 as a handle, may be used on the interior or exterior of the vehicle 2, such as the illuminable exterior door handle 14 depicted in FIG. 1. The materials used to make the vehicle component 18 are not particularly limited, and the materials may comprise polymer, metal, wood, ceramic, glass, stone, leather, or combinations thereof.

The illumination mechanism of the vehicle component is not limited in any way and can include luminescent light sources (e.g. electroluminescent, photoluminescent, mechanoluminescent light sources), and incandescent light sources. Illustrative examples include a light emitting diode and an organic light-emitting diode configured in a film or sheet. In a non-limiting example, the illumination is provided by a photoluminescent or electroluminescent light source (PL/EL light source) 24, which is a thin flexible sheet-like structure. An advantage of the PL/EL light source 24 is its ability to provide uniform illumination over large surfaces and its flexibility so that it can be applied directly to the A-surface of three dimensionally contoured parts.

Activation of the light source 24 so that it emits light can be achieved in an active manner by supplying electrical power to an electroluminescent light source (i.e. active luminescence or illumination), or can be achieved in a passive manner by allowing a photoluminescent light source to be exposed to an ambient energy source such as light, heat and/or vibration (passive luminescence or illumination). For active luminescence, the illumination of the vehicle component may be controlled utilizing power from the vehicle's power source. For passive luminescence, the illumination of the vehicle component may be controlled utilizing power from other sources, such as ambient light, heat produced from the engine, exhaust system or heating system of the vehicle, or vibration created during operation of the vehicle.

In one embodiment, the PL/EL light source 24 is a photoluminescent (PL) light source and the luminescent mechanism is accomplished by passive illumination. In another embodiment, the PL/EL light source 24 is an electroluminescent (EL) light source (e.g. EL light source 34 depicted in FIG. 6) and the luminescent mechanism is accomplished by active illumination.

The PL/EL light source 24 may be configurable in the form of a flexible film or coating so that the light source 24 can be conformed to the contours and shape of an A-surface 22 of the vehicle component 18 to which it is mated, which A-surface 22 may include complex curves. As used herein, the A-surface refers to the surface of a vehicle component that is most visible after the vehicle component is assembled and arranged on the vehicle, while a B-surface, a C-surface, a D-surface, etc. of the vehicle component are other surfaces of the vehicle component that are progressively less visible than the A-surface. On interior vehicle components for example, the A-surface is usually facing the occupants and visible to the occupants. On exterior vehicle components for example, the A-surface is usually facing towards the outside of the vehicle and visible to those at an exterior of the vehicle.

In a non-limiting example and as depicted in FIGS. 3-5, the vehicle component 18 includes an A-surface 22, and a PL/EL light source 24 that is arranged over the A-surface 22. As depicted in FIGS. 3-5, the PL/EL light source 24 is contacting the A-surface 22. However, it will be appreciated that the electroluminescent or photoluminescent light source 24 may be over, on, applied to, or otherwise covering the A-surface 22, and is not required to contact the A-surface 22 of the vehicle component 18. Additionally, as depicted in FIG. 5 for example, the A-surface 22 of the vehicle component 18 (i.e. handle 20) may be contoured and include complex curves. However, the PL/EL light source 24 is flexible and is therefore conformable. Accordingly, the PL/EL light source 24 conforms to the contours of the A-surface 22 on which it is arranged. When applied as a flexible film or coating, the shape of the PL/EL light source 24 becomes similar to the shape of the A-surface 22 of the component 18. This conformal nature of the PL/EL light source 24 is shown for example in FIG. 5, wherein the PL/EL light source 24 is curved to conform to the curve of the A-surface 22 of the handle 20. It will be appreciated however, that exemplary vehicle components may include more or less, and different contours on the A-surface than are depicted in FIG. 5.

Moreover, because the PL/EL light source 24 is thin, it can be applied directly to or over the exposed A-surface 22 without interfering with the functionality or aesthetics of the vehicle component 18, and therefore is not required to be arranged in a housing, recess, or compartment formed in or associated with the vehicle component 18 or in a housing arranged elsewhere.

Figure 6:
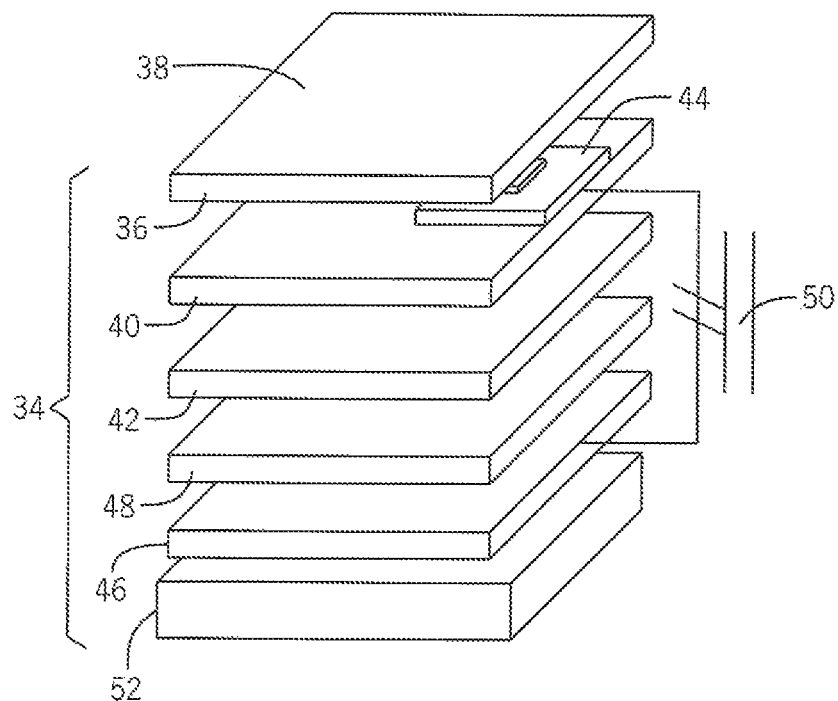
FIG. 6 is a schematic partial exploded view of a portion of an electroluminescent light source according to an exemplary embodiment.

In an exemplary embodiment, and as depicted in FIGS. 4-6, the vehicle component 18 does not include a housing or recess for accommodating the light source 24, and the PL/EL light source 24 is not located in a housing or recess in or associated with the vehicle component 18. Instead, the light source 24 is arranged over, mounted on, or in contact with the A-surface 22 of the vehicle component 18. This arrangement is in contrast to conventional light sources used to illuminate vehicle components, which include relatively bulky LEDs arranged in a housing defined by or associated with the vehicle component, wherein the LEDs are mounted on an interior surface of the housing, which is not the A-surface of the vehicle component. Such configuration of the light source 24 on the A-surface 22 of the vehicle component 18 allows the vehicle component to include a more simple design, and allows for easy application of the light source 24 to the A-surface 22, for example after the vehicle component 18 is assembled. This is in contrast to LEDs, which may be required to be arranged in the housing defined by the vehicle component during assembly of the vehicle component or often before the vehicle component is arranged on the vehicle. Accordingly, the vehicle component 18 can be more easily constructed since it does not have to include a housing or recess, which are defined by or located within the vehicle component and are conventionally required for more bulking lighting fixtures such as LEDs.

Instead, the light source 24 is applied to the exposed A-surface 22 of the component 18, which simplifies construction of the vehicle component 18 since no housing is required.

In an alternative example, the light source can be integrated directly into fabric or plastics used to construct the illuminable vehicle component, rather than as a distinct layer applied to the A-surface of the component. For example, a photoluminescent material can be included as a mold in color (MIC) in a moldable material used for molding a vehicle component, or included in a yarn or thread for use in making a fabric for covering a vehicle component.

The illuminable vehicle component 6 also includes a pigmented layer 26 arranged over the PL/EL light source 24 to cover the PL/EL light source 24. In a non-limiting example and as shown in FIGS. 4-6, the pigmented layer 26 is in contact with the PL/EL light source 24, for example by being applied directly to the PL/EL light source 24. When the PL/EL light source 24 is not activated to emit light, the pigmented layer 26 has an opaque appearance, such that the pigmented layer hides or obscures the underlying inactivated PL/EL light source 24 from view, and presents an opaque appearance for the illuminable vehicle component 6. However, the pigmented layer 26 is not completely opaque and is at least somewhat transparent. As used herein, "transparent" refers to a material or layer that is not completely opaque, and which allows at least some light to be transmitted therethrough, and includes transparent and translucent materials that can be colored or colorless. Accordingly, when the PL/EL light source 24 is activated to emit light, at least a portion of the light is transmitted through the pigmented layer 26 (and through an optional clear top coat 28 discussed herein) to provide an illuminated appearance for the illuminable vehicle component 6 that is different from the opaque appearance. To accomplish this effect, the PL/EL light source 24 has an intensity, and the pigmented layer 26 has a thickness and a pigment loading level, such that when the PL/EL light source 24 is activated to emit light, light emitted from the PL/EL light source 24 is transmitted through the pigmented layer 26 to provide an illuminated appearance to the illuminable vehicle component 6; yet when the PL/EL light source 24 is not activated and is therefore not emitting light, the pigmented layer 26 provides an opaque appearance to the illuminable vehicle component 6.

In a non-limiting embodiment, the pigmented layer 26 includes metal, e.g. aluminum, bronze, nickel, stainless steel, zinc, cadmium, tin, gold, silver, or copper, and provides a metal or metal-like appearance (e.g. a chrome or chrome-like appearance) to the illuminable vehicle component 6 when the PL/EL light source 24 is not activated. This can be accomplished by applying a metal or metal-like surface treatment (e.g., film, coating, hydrographic, etc.) over the PL/EL light source 24. In a non-limiting example, the metal-like appearance can be provided by applying a layer over, or directly to the PL/EL light source 24 via physical vapor deposition (PVD) such as sputtering, by a spray method including application of an acidic metal salt solution in order to form metal deposits on the PL/EL light source 24 and as described in U.S. Pat. No. 6,390,636, the disclosure of which is incorporated herein by reference, using a coating material including a binder and metal particles mixture, injection molding techniques to form a film, electroless plating, dip coating, electroplating, vacuum plating/deposition, painting, thermal spraying, or powder coating. In a non-limiting example, the coating material includes metal flakes, e.g. aluminum flakes, produced for example by vacuum metallization. The aluminum flakes may be used to produce a chrome or chrome-like appearance over the PL/EL light source 24. As will be understood, the particle (e.g. flake) loading of the coating material will be commensurate with the thickness of the pigmented layer 26, wherein a lower particle loading will be associated with a thicker pigmented layer and a higher particle loading will be associated with a thinner pigmented layer.

In one embodiment, the pigmented layer 26 has a thickness and pigment loading, and the PL/EL light source has an intensity, sufficient to provide an illuminable vehicle component 6 with a luminance of greater than or equal to 13 cd/m$^2$. In one embodiment, the thickness of the pigmented layer is about 5-10 μm.

The illuminable vehicle component 6 also optionally includes an optically clear top coat 28 covering the pigmented layer 26 and used to protect the pigmented layer 26 from deterioration from abrasion, exposure to the elements or chemicals, or other deleterious agents. The clear top coat 28 is not particularly limited, and in one non-limiting example is made from acrylic urethane resin. It will be appreciated that other resins and coatings may be used.

In one embodiment as depicted in FIGS. 4 and 5, the vehicle component 18 may have an exposed back surface 30 oppositely directed from the A-surface 22. In a non-limiting example, a back electroluminescent light source 32 (back EL light source) is arranged over (e.g. in contact with) the back surface 30 of the vehicle component 18. The back EL light source 32 may be an EL light source 34 as depicted in FIG. 6. Since the back EL light source 32 is arranged over the back surface 30, the back EL light source 32 may not be directly visible, but when activated, may emit light that provides backlighting to the illuminable vehicle component 6. Such backlighting of the illuminable vehicle component 6 may allow a user of the vehicle 2 to more easily locate the illuminable vehicle component 6 (e.g. handle 20) in dim situations, without providing illumination directly from the PL/EL light source 24 covering the A-surface 22. Moreover, as discussed in more detail herein, illumination from the PL/EL light source 24 and the back EL light source 32 may be coordinated or provided separately to produce varied lighting effects for the illuminable vehicle component 6. Light emitted by the back EL light source 32 may have a different color than light emitted by the PL/EL light source 24 for example. Therefore, light emitted from the front of the illuminable vehicle component 6 may have different chromaticity coordinates than light emitted from the back of the illuminable vehicle component 6. Other configurations for the illuminable vehicle component 6 can be used as desired to achieve a particular illuminated effect or design.

In addition, front illumination of a particular vehicle component can be enhanced by applying an additional PL/EL light source over the pigmented layer, such that light emitted from the additional PL/EL light source does not pass through the pigmented layer because the pigmented layer is arranged below the additional PL/EL light source. This additional illumination can provide added highlight to an interior or exterior vehicle component. Illumination can be uniform, or the additional PL/EL light source can be formed into a shape such as automobile badge or insignia.

In a non-limiting example, the electroluminescent light source 34, whether used on the A-surface 22 or on the back surface 30 of the vehicle component 18, may be in the form of electroluminescent assemblies disclosed in U.S. Pat. No. 8,470,388, the contents of which is incorporated by reference herein. With reference to FIG. 6, an exemplary stacking arrangement for an EL light source 34 is schematically illustrated.

As depicted, one or more top layers 36 can be provided as a transparent top coat that presents the exposed surface 38 of the EL light source 34. The one or more top layers 36 provide protection to the electroluminescent light source 34, and can have a total thickness of 25 microns to 125 microns.

An electrically conductive top electrode 40 is provided under the one or more top layers 36. The top electrode 40 is a film coating layer that is preferably both electrically conductive and generally transparent to light. Top electrode 40 may comprise such materials as, without limitation, conductive polymers (PEDOT), carbon nanotubes (CNT), antimony tin oxide (ATO) and indium tin oxide (ITO). An illustrative commercial product is CLEVIOS™ conductive, transparent and flexible polymers (available from Heraeus Clevios GmbH of Leverkusen, Germany) diluted in isopropyl alcohol as a thinner/drying agent. CLEVIOS™ conductive polymers exhibit relatively high efficacy. In addition, CLEVIOS™ conductive polymers are based on a styrene co-polymer and thus provides a ready mechanism for chemical crosslinking/mechanical bonding with the underlying phosphor layer 42. In a non-limiting example, the top electrode 40 has a thickness of 1 to 25 microns.

A bus bar 44 is interposed between the top layer 36 and the top electrode 40. The bus bar 44 may be provided as a relatively low-impedance strip of conductive material, usually comprised of one or more of the materials usable to produce the bottom or rear electrode 46. In an illustrative example, the bus bar 44 is comprised of silver. The bus bar 44 is typically applied to the peripheral edge of the lit field. Although bus bar 44 is generally depicted as being on top of the top electrode 40 in the figures, the bus bar 44 may be applied adjacent to the top electrode 40, or below the top electrode 40.

Below the top electrode 40, a phosphor layer 42 is provided. Phosphor layer 42 is a semi-conductive film coating layer comprised of a material (such as metal-doped Zinc Sulfide (ZnS)) encapsulated within an electrostatically permeable polymer matrix. When excited by the presence of an alternating electrostatic field generated by an AC signal, the doped ZnS absorbs energy from the field, which it in turn re-emits as a visible-light photon upon returning to its ground state. In a non-limiting example, the hydroxide. To this solution, a quantity of metal-doped ZnS based phosphors doped with at least one of copper, manganese and silver (i.e., ZnS:Cu, Mn, Ag, etc.) pre-wetted in a dilute ammonium hydroxide is added to form a supersaturated suspension. In a non-limiting example, the phosphor layer 42 comprises a thickness of 30 to 100 microns.

Below the phosphor layer 42, a dielectric layer 48 is provided that electrically insulates the phosphor layer 42. Dielectric layer 48 may be an electrically non-conductive film coating layer comprising a material (typically Barium Titanate—$BaTiO_3$) possessing high dielectric constant properties encapsulated within an insulating polymer matrix having relatively high permittivity characteristics (i.e., an index of a given material's ability to transmit an electromagnetic field). In an illustrative example, the dielectric layer 48 comprises about a 2:1 solution of co-polymer and dilute ammonium hydroxide. To this solution a quantity of $BaTiO_3$, which has been pre-wetted in ammonium hydroxide, may be added to form a supersaturated suspension. The dielectric layer 48 may be transparent or opaque. In a non-limiting example, the dielectric layer 48 may comprise at least one of a titanate, an oxide, a niobate, an aluminate, a tantalate, and a zirconate material, among others.

Below the dielectric layer 48, the rear electrode layer 46 is provided, which is electrically connected to the conductive lead 50, which is connected to a power source of the vehicle 2 to thereby provide power to the electroluminescent light source 34 so that it emits light. The conductive lead 50 may comprise any of the materials that may be used for the top electrode 40 or the rear electrode 46. The rear electrode layer 46 is a film coating layer that may be a sprayable conductive material and may form the lit electroluminescent "field". In a non-limiting example, the rear electrode 46 may be made using a highly conductive, generally opaque material. Examples of such materials include, without limitation, an alcohol/latex-based, silver-laden solution such as SIL-VASPRAY™ available from Caswell, Inc. of Lyons N.Y., and a water-based latex, copper-laden solution such as "Caswell Copper" copper conductive paint, also available from Caswell, Inc., and mixtures thereof. In a non-limiting example, the rear electrode 46 may be a metal plating wherein a suitable conductive metal material is applied to a non-conductive substrate 52 using any suitable process for the select metal plating. Example types of metal plating include, without limitation, electroless plating, vacuum metalizing, vapor deposition and sputtering. In one embodiment, the rear electrode 46 is provided on a substrate 52, with subsequent layers being formed thereon to provide an electroluminescent light source 34. In other embodiments, the rear electrode 46 may comprise transparent materials. The rear electrode 46 may be made from an electrically conductive, generally clear transparent layer such as, without limitation, "CLEVIOS™ S V3" and or "CLEVIOS™ S V4" conductive polymers, available from Heraeus Clevios GmbH of Leverkusen, Germany.

Finally, a primer layer (not shown) may be positioned between the rear electrode 46 and the substrate 52. The primer layer may be oxide-based and may serve to electrically insulate the subsequent conductive and semi-conductive layers from the substrate/transparent panel, and/or may also promote adhesion between substrate 52 and subsequently applied layers. In a non-limiting example, the primer layer may be a transparent layer, such as a transparent polymeric material. Illustrative examples include polyurethane coatings such as single or two-component polyurethane systems. In one embodiment, the substrate 52 is the vehicle component 18, wherein the other layers of the EL light source 34 are arranged on the A-surface 22 of the vehicle component 18 without using a separate layer or material as the substrate. In this embodiment, the other layers of the EL light source 34 may be applied to the A-surface 22 of the vehicle component 18 by spray application methods for example.

Additionally, the conductive lead 50 can be electrically connected to a power source of the vehicle 1, to thereby electrically connect the electroluminescent light source 34 to the power source of the vehicle to allow for active illumination of the vehicle component. During operation, a voltage supply to the conductive lead 50 can be varied to change a brightness of the electroluminescent light source 34. Also, a frequency of the power supplied to the conductive lead 50 can be varied to change a color of the electroluminescent light source 34.

In accordance with the present subject matter, PL/EL light source 24 is a photoluminescent light source, which may be a layer including a photoluminescent material, for example a polymer material mixed with a photoluminescent material such as zinc sulfide, strontium aluminate, calcium sulfide, or an alkaline earth metal silicate.

The PL/EL light source 24, whether it be an EL light source 34 or a PL light source, can be included in a variety of shapes, sizes, configurations, and at a plurality of locations on the A-surface 22 of the vehicle component 18. Because the PL/EL light source 24 is flexible, it can be conformed to the contours and shape of the A-surface 22 of the vehicle component 18, which may include complex curves to form a distinctive illuminable vehicle component 6. In accordance with the present disclosure, the illuminable vehicle component 6 can include additional light sources (e.g. an EL light source 34 or PL light source) as desired arranged on a surface of the vehicle component other than the A-surface or back surface. The PL/EL light source 24, back EL light source 32, and any additional light sources can be used to allow for easy visual recognition of the vehicle component or can be used as part of an ornamental design to provide a distinctive aesthetic appearance to the vehicle component or to the vehicle.

The PL/EL light sources 24 associated with the various Illuminable vehicle components 6, may be activated to emit light jointly or separately from each other. In a non-limiting example and with reference to FIG. 5, the PL/EL light source 24 and the back EL light source 32 may be activated jointly or separately to emit light. In another non-limiting example and with reference to FIG. 1, the Illuminable grill 8, illuminable rim 10, illuminable side streamer 12, and illuminable exterior handle 14, all of which include a PL/EL light source 24 on their respective A-surfaces, may be activated jointly or separately from each other.

Activation of the PL/EL light source 24, whether it be an EL light source 34 or a PL light source, may be paired to certain operations or characteristics of the vehicle in order to provide an illumination to a vehicle component. For example with reference to FIGS. 1 and 2, activation of a PL/EL light source 24 associated with the illuminable grill 8 or illuminable side streamer 12 may be paired to operation of a vehicle, such that the illuminable grill 8 or illuminable side streamer 12 are each illuminated during vehicle operation and not illuminated when the vehicle is not being operated.

In a non-limiting example, a PL/EL light source 24 associated with the illuminable rim 10, may be a photoluminescent light source, and therefore activated by ambient light having an intensity over a certain threshold, and may emit light for up to ten hours after the intensity of the ambient light falls below the threshold. In another embodiment, the illuminable rim 10 includes a mechanoluminescent light source on its A-surface, such that the mechanoluminescent light source emits light upon vibrations produced during operation of the vehicle 2. In still another embodiment, the illuminable rim 10 includes an electroluminescent light source 34 on its A-surface. The EL light source 34 is electrically connected to a piezoelectric material, which produces power from movement (e.g. vibration or rotation) of the associated vehicle wheel during vehicle operation. The power generated by the piezoelectric material is then supplied to the EL light source 34 for emitting light. The piezoelectric material may include one or more of naturally occurring crystals such as quartz, berlinite ($AlPO_4$), sucrose (table sugar), rochelle salt, topaz, tourmaline-group minerals, and lead titanate; synthetic crystals such as langasite ($La_3Ga_5SiO_{14}$), gallium orthophosphate ($GaPO_4$), lithium niobate ($LiNbO_3$), and lithium tantalate ($LiTaO_3$); synthetic ceramics such as barium titanate ($BaTiO_3$), lead zirconate titanate ($Pb[Zr_xTi_{1-x}]O_3$ with $0 \leq x \leq 1$), potassium niobate ($KNbO_3$), sodium tungstate ($Na_2WO_3$), $Ba_2NaNb_5O_5$, $Pb_2KNb_5O_{15}$, zinc oxide (ZnO); lead-free piezoceramics such as sodium potassium niobate ($(K,Na)NbO_3$), bismuth ferrite ($BiFeO_3$), sodium niobate ($NaNbO_3$), barium titanate ($BaTiO_3$), bismuth titanate ($Bi_4Ti_3O_{12}$), and sodium bismuth titanate $NaBi(TiO_3)_2$; III-V and II-VI semiconductors; polymers such as polyvinylidene fluoride; and organic nanostructures such as self-assembled diphenylalanine peptide nanotubes. The piezoelectric material may be arranged as a layer of the illuminable vehicle component 6, such as between the PL/EL light source 24 and the vehicle component 18, or may be arranged elsewhere on the illuminable rim 10, for example on a portion of the A-surface 22 of the rim not occupied by the PL/EL light source 24, on a surface of the rim 10 other than the A-surface, such as the back surface 30 oppositely directed from the A-surface, or on another surface of the rim 10 as desired. In each of these embodiments, the PL/EL light source 24 on the illuminable rim 10 may be covered with a pigmented layer 26 providing a metallic or metallic-like appearance, such that illuminable rim 10 displays the metallic or metallic-like appearance when the rim 10 is not illuminated by the PL/EL light source 24.

Activation of a PL/EL light source 24 associated with the A-surface of illuminable exterior handle 14, which may comprise the illuminable vehicle component 6C depicted in FIG. 5, may be paired with proximity of a vehicle key, a key fob, or an operator to the illuminable exterior door handle 14, such that the door handle is illuminated when the vehicle key, key fob, or operator are within a certain distance from the illuminable exterior door handle 14.

In a non-limiting example, when the illuminable vehicle component 6C is arrange in an interior of a vehicle, activation of the PL/EL light source 24 arranged over the A-surface 22, and the back EL light source 32 arranged over the back surface 30 of the handle 20 may each be paired with operation of the vehicle, such that the back EL light source 32 is activated to emit light during operation of the vehicle to provide backlighting to the handle 20, and the PL/EL light source 24 is activated to emit light when the engine is turned off and there is an occupant in the interior of the vehicle. The intensity and color of light emitted by the PL/EL light source 24 and the back EL light source 32 may be the same or different. In a non-limiting example, the intensity of the light emitted by the back EL light source 32 is less than that emitted by the PL/EL light source 24. As will be understood, the various PL/EL light sources and back EL light sources may be activated differently as desired to achieve a particular illuminating effect for the various illuminable vehicle components. That is, PL/EL light source 24 and Back EL light source 32 may each be individually paired to other vehicle operations for activation, including when an engine of the vehicle is running, during powered movement of the vehicle, during non-movement of the vehicle, continuously, or combinations thereof for example.

Activation of the various illuminable vehicle components and the various light sources on individual illuminable vehicle components may be initiated in unison or separately. The present subject matter includes illumination of a vehicle component to add visual accent to the vehicle component in order to provide additional aesthetic appeal to the component, to help locate the component in dim lighting situations, or a combination thereof.

Thus, while the vehicle is operating, the PL/EL light source 24 or the back EL light source 32 may be configured to emit light constantly, only at certain times or only under certain circumstances, or triggered by certain events or vehicle characteristics in order to provide for continuous, intermittent, or regular illumination of vehicle components. Activation of the PL/EL light source 24 or the back EL light source 32 may be limited to dimly lit environmental conditions having an amount of ambient light that is below a certain threshold and thus benefitting from illumination of the vehicle components; or such activation may not be so limited and may be initiated in all or some conditions or under a predetermined or selectable set of circumstances as desired.

In a non-limiting example, active illumination of the vehicle component may cease once the electrical power of the vehicle is turned off, or illumination may be continued thereafter for a certain period of time using energy provided by the vehicle's battery. In another non-limiting example, the activation and deactivation of the light source can be controlled as desired by a user of the vehicle. For passive luminescence, a photoluminescent light source may provide illumination in excess of ten hours after termination of an applied energy source.

Figure 7:
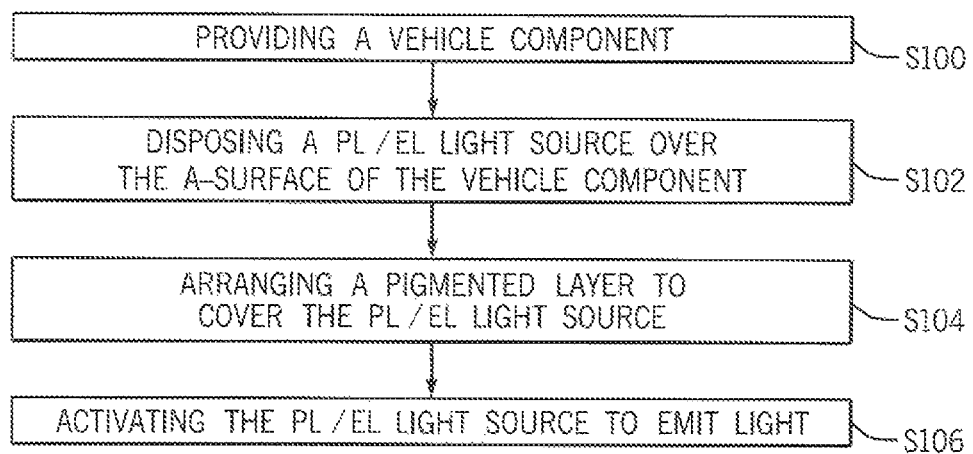
FIG. 7 is a schematic block diagram illustrating an exemplary method of illuminating a vehicle component.

With reference to FIG. 7, a schematic block diagram illustrating a method of illuminating a vehicle component will now be discussed. The method will be described in association with the illuminable vehicle components 6 discussed herein (shown in FIGS. 1-5), though this is not required and the method can be used with other illuminable vehicle components.

In the method, at S100, a vehicle component 18, 20 is provided. The vehicle component has an A-surface 22. It will be appreciated that the vehicle component may be a handle 20, a grill, a side streamer, a rim of a wheel, or other vehicle component and the component may be an interior or exterior vehicle component.

At S102, a PL/EL light source 24 is disposed over the A-surface 22 of the vehicle component 18, 20. The PL/EL light source 24 emits light when activated and is conformed to the contours of the A-surface. At S104 a pigmented layer 26 is arranged to cover the PL/EL light source 24. At S106 the PL/EL light source 24 is activated to emit light, thereby changing an appearance of the pigmented layer 26 from an opaque chrome appearance to an illuminated appearance. That is, when the PL/EL light source 24 is not activated, the pigmented layer 26 may present an opaque appearance. When the PL/EL light source 24 is activated, light emitted from the PL/EL light source 24 is a) transmitted through the pigmented layer 26 the illuminable vehicle component presents an illuminated appearance. The method may optionally include applying a clear top coat 28 over the pigmented layer 26 to provide protection to the pigmented layer 26 from damage.

The pigmented layer 26 may be applied by plasma vapor deposition or other deposition technique as discussed herein, and may have a thickness of 5-10 μm. The PL/EL light source 24 provides a luminance that is visible through the pigmented layer with an intensity of at least 13 cd/m².

The method may also include applying a back electroluminescent light source 32 on a back surface 30 of the vehicle component 18, 20, and activating the back electroluminescent light source 32 to emit light to thereby provide backlighting to the vehicle component 18, 20.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle component including:
an electroluminescent or photoluminescent light source arranged on an A-surface of the vehicle component,
a pigmented layer covering the light source, and
a clear top coat layer covering the pigmented layer;
wherein when the light source is not activated, the pigmented layer has an opaque appearance,
wherein when the light source is activated, the light source emits light that is visible through the pigmented layer and the clear top coat layer to thereby illuminate the vehicle component,
wherein the light source has a shape that is conformed to contours of the A-surface,
wherein the light emitted from the light source is transmitted through a material of the pigmented layer.

2. The vehicle component of claim 1, wherein the light source is not located in a housing associated with the vehicle component.

3. The vehicle component of claim 1, wherein the light source is an electroluminescent light source that is configured to be activated by electrical power provided from a power source of the vehicle, and wherein the electroluminescent light source provides a luminance of at least 13 cd/m² at a surface of the clear top coat.

4. The vehicle component of claim 1, wherein the light source includes a material that is activated by being exposed to light, heat, vibration, or a combination thereof.

5. The vehicle component of claim 1, wherein the pigmented layer has a thickness of 5-10 μm and includes metal particles such that the opaque appearance is a chrome appearance.

6. The vehicle component of claim 1, wherein the vehicle component comprises a wheel rim, a door handle, a grill, or a side streamer.

7. The vehicle component of claim 1, further comprising a back electroluminescent light source that emits light when activated, wherein:
the back electroluminescent light source is arranged on a back surface of the vehicle component that is opposite from the A-surface of the vehicle, and
the back electroluminescent light source has as shape that is conformed to contours of the back surface.

8. The vehicle component of claim 7, wherein when activated, the back electroluminescent light source provides backlighting to the vehicle component.

9. The vehicle component of claim 8, wherein light emitted from the light source has different chromaticity coordinates than light emitted from the back electroluminescent light source.

10. The vehicle component of claim 8, wherein the light source and the back electroluminescent light source are configured to be activated jointly and separately.

11. A vehicle, comprising:
a component having an A-surface,
an electroluminescent or photoluminescent light source arranged on the A-surface and having a shape that is conformed to contours of the A-surface, and
a pigmented layer covering the light source;
wherein when the light source is not activated, the pigmented layer provides an opaque appearance to the component, wherein when the light source is activated, the light source emits light that is visible through the pigmented layer to thereby provide an illuminated appearance to the component, and wherein the light emitted from the light source is transmitted through a material of the pigmented layer.

12. The vehicle of claim 11, wherein the light source is not located in a housing associated with the component.

13. The vehicle of claim 11, further comprising a clear top coat layer covering the pigmented layer, wherein when the light source is activated, the light source emits light that is visible through the clear top coat layer.

14. The vehicle of claim 11, wherein:

the component is a rim of a wheel, and the light source is activated by vibrations produced during operation of the vehicle.

15. The vehicle of claim 11, wherein:

the component includes a back surface opposite the A-surface, the vehicle further comprises a back electroluminescent light source that emits light when activated, the back electroluminescent light source is arranged on the back surface of the component, and the back electroluminescent light source has a shape that is conformed to the contours of the back surface.

16. The vehicle of claim 15, wherein:

the component is a handle, and light emitted by the back electroluminescent light source provides backlighting to the handle.

* * * * *